US011478802B2

(12) United States Patent
Månsson et al.

(10) Patent No.: US 11,478,802 B2
(45) Date of Patent: Oct. 25, 2022

(54) SPRAY NOZZLE ARRANGEMENT

(71) Applicant: BALDWIN JIMEK AB, Arlöv (SE)

(72) Inventors: Patrik Månsson, Höllviken (SE);
Frank Månsson, Malmö (SE); Joacim Wellander, Klagshamn (SE)

(73) Assignee: Baldwin Jimek AB, Arlöv (SE)

( * ) Notice: Subject to any disclaimer, the term of this patent is extended or adjusted under 35 U.S.C. 154(b) by 32 days.

(21) Appl. No.: 16/342,337

(22) PCT Filed: Oct. 6, 2017

(86) PCT No.: PCT/EP2017/075535
§ 371 (c)(1),
(2) Date: Apr. 16, 2019

(87) PCT Pub. No.: WO2018/073026
PCT Pub. Date: Apr. 26, 2018

(65) Prior Publication Data
US 2019/0283047 A1    Sep. 19, 2019

(30) Foreign Application Priority Data
Oct. 19, 2016  (SE) .................................... 1651371-5

(51) Int. Cl.
*B05B 1/04*    (2006.01)
*A01M 7/00*   (2006.01)
(Continued)

(52) U.S. Cl.
CPC ............. *B05B 1/044* (2013.01); *A01M 7/006* (2013.01); *B05B 1/08* (2013.01); *B05B 1/14* (2013.01);
(Continued)

(58) Field of Classification Search
CPC .. B05B 1/08; B05B 1/14; B05B 1/044; B05B 13/0207; B05B 13/0278; A01M 7/006
(Continued)

(56) References Cited

U.S. PATENT DOCUMENTS 375,121 A * 12/1887 Chappell ................. F28F 25/04
239/193
541,660 A *  6/1895 Duffy ...................... F28F 25/04
239/193
(Continued)

FOREIGN PATENT DOCUMENTS

AT            367321 B    6/1982
CA          1203375 A    4/1986
(Continued)

OTHER PUBLICATIONS

International Search Report and Written Opinion for PCT/EP2017/075534 dated Dec. 13, 2017.
(Continued)

*Primary Examiner* — Qingzhang Zhou
(74) *Attorney, Agent, or Firm* — Thompson Coburn LLP (57) ABSTRACT

An arrangement for spraying a fluid to a piece of material, such as a web or strip, has a chamber through which the material runs, and an applicator (15) which is configured to spray the fluid on the material. The applicator includes at least a first and a second valve (16, 16a, 16b, 16c) arranged within the chamber, each valve having a longitudinal axis, and each valve comprising a spray nozzle (17, 17a, 17b, 17c). Each spray nozzle has an elongated opening extending along an axis. The longitudinal axis of the valve and the axis of the corresponding nozzle span a plane and the at least said first valve and said second valve are arranged spaced on a common axis (CA) running through a center point of each valve. The plane is inclined in relation to the common axis.

21 Claims, 7 Drawing Sheets

(51) Int. Cl.
*B05B 1/08* (2006.01)
*B05B 1/14* (2006.01)
*B05B 13/02* (2006.01)
*B05B 15/652* (2018.01)

(52) U.S. Cl.
CPC ...... *B05B 13/0207* (2013.01); *B05B 13/0278* (2013.01); *B05B 15/652* (2018.02)

(58) Field of Classification Search
USPC ........................................................ 239/592
See application file for complete search history.

(56) References Cited

U.S. PATENT DOCUMENTS

| | | | | |
|---|---|---|---|---|
| 930,926 | A * | 8/1909 | Bentley | B05B 1/044 |
| | | | | 239/193 |
| 1,051,846 | A * | 1/1913 | Brown | B05B 1/044 |
| | | | | 239/193 |
| 3,273,805 | A * | 9/1966 | Hall | B05B 1/14 |
| | | | | 239/590.3 |
| 3,447,756 | A * | 6/1969 | Lawrence, Jr. | B21B 45/08 |
| | | | | 239/594 |
| 3,776,471 | A * | 12/1973 | Meyer | B05B 1/044 |
| | | | | 239/553.5 |
| 3,814,322 | A | 6/1974 | Waldrum | |
| 3,908,408 | A | 9/1975 | Getchell et al. | |
| 3,930,464 | A | 1/1976 | Wallsten | |
| 3,995,684 | A | 12/1976 | Schmid | |
| 4,023,385 | A | 5/1977 | Hurd | |
| 4,142,854 | A | 3/1979 | Sando et al. | |
| 4,231,318 | A | 11/1980 | Zink | |
| 4,247,047 | A * | 1/1981 | Schaming | B05B 1/16 |
| | | | | 134/198 |
| 4,656,063 | A * | 4/1987 | Long | B05B 1/044 |
| | | | | 118/DIG. 4 |
| 5,316,588 | A * | 5/1994 | Dyla | B05B 13/0214 |
| | | | | 134/9 |
| 5,342,657 | A | 8/1994 | Budjinski et al. | |
| 5,547,129 | A | 8/1996 | Fortunato et al. | |
| 6,367,718 | B1 * | 4/2002 | Lotz | B22D 11/126 |
| | | | | 239/556 |
| 7,621,286 | B2 * | 11/2009 | Frei | B05B 1/20 |
| | | | | 134/131 |
| 9,118,013 | B2 * | 8/2015 | Kaiho | H01L 51/0005 |
| 9,186,881 | B2 * | 11/2015 | Vinnay | D21G 7/00 |
| 2003/0108678 | A1 * | 6/2003 | Wegehaupt | D21G 7/00 |
| | | | | 427/280 |
| 2007/0125886 | A1 * | 6/2007 | Zillig | B05B 7/0408 |
| | | | | 239/556 |
| 2008/0014361 | A1 * | 1/2008 | Johannessen | B05B 14/00 |
| | | | | 427/421.1 |
| 2009/0282621 | A1 * | 11/2009 | Kennedy | F16J 15/168 |
| | | | | 8/149.2 |
| 2011/0189402 | A1 * | 8/2011 | Wagner | B05C 11/1039 |
| | | | | 427/345 |
| 2012/0111431 | A1 | 5/2012 | Singh | |
| 2015/0375247 | A1 | 12/2015 | Funseth et al. | |
| 2019/0283047 | A1 * | 9/2019 | Månsson et al. | B05B 13/0207 |
| 2020/0122165 | A1 * | 4/2020 | Choi | B05B 1/3402 |

FOREIGN PATENT DOCUMENTS

| | | |
|---|---|---|
| CA | 2084637 C | 9/2002 |
| CN | 1060044 A | 4/1992 |
| CN | 105142801 A | 12/2015 |
| DE | 1796280 A1 | 11/1972 |
| DE | 2711428 A1 | 9/1977 |
| DE | 3014542 A1 | 10/1981 |
| DE | 19646568 A1 | 5/1998 |
| EP | 0006763 A2 | 1/1980 |
| EP | 0060375 A2 | 9/1982 |
| EP | 0323316 A2 | 7/1989 |
| EP | 1413430 B1 | 6/2005 |
| EP | 2789397 A1 | 10/2014 |
| EP | 3069794 A1 | 9/2016 |
| GB | 1306897 A | 2/1973 |
| GB | 1426442 A | 2/1976 |
| GB | 1474087 A | 5/1977 |
| GB | 2326609 A | 12/1998 |
| GB | 2326609 B | 1/2001 |
| GB | 2337984 B | 7/2003 |
| JP | S58128137 A | 7/1983 |
| JP | 3285384 B2 | 5/2002 |
| WO | 2013002704 A1 | 1/2013 |
| WO | 2013158458 A2 | 10/2013 |
| WO | 2016162048 A1 | 10/2016 |
| WO | 2018073025 A1 | 4/2018 |

OTHER PUBLICATIONS

International Search Report and Written Opinion for PCT/EP2017/075535 dated Dec. 8, 2017.
Swedish Search Report for Serial No. 1651371-5 dated Apr. 27, 2017.
Swedish Search Report for Serial No. 1651370-7 dated Apr. 27, 2017.

* cited by examiner

SPRAY NOZZLE ARRANGEMENT

CROSS-REFERENCE TO RELATED APPLICATIONS

This application is a national stage application of International Patent Application No. PCT/EP2017/075535, filed on Oct. 6, 2017, which claims the benefit of Swedish Patent Application No. 1651371-5 filed on Oct. 19, 2016, both of which are incorporated herein by reference in their entireties.

TECHNICAL FIELD

The present invention relates to a spray nozzle arrangement for spraying fluid on a piece of material, such as a web or strip, running through a spray chamber.

BACKGROUND

In production sites, manufacturing material such as textile, paper, wood, plastic or other, different types of fluids are used to process the material in order to get different qualities. Oftentimes, a web of the material is run through different stations in a process. A common way is to spray, bathe or use rotating discs to apply fluids to a surface, where the fluid in turn provides the material with a desired quality. The quality that the fluid provides the material with can be anything from dirt-repellent, water-repellent and flame proof to making the material softer or putting on adhesive. One problem with spray arrangement used today is that the spray result is not regular over the sprayed surface of the web. Spray pattern of nozzles often overlap each other providing a spray pattern where one area gets sprayed with more fluid than an adjacent area.

EP0323316A2 describes an arrangement where the spray nozzle travels across a surface being sprayed in order to achieve an even result. U.S. Pat. No. 5,547,129A discloses a more common design, in which a number of nozzles are placed in a line. These two known arrangements do however not provide a solution to the problem of uneven spray result. Other problems that spray arrangements today sometimes face are a too high consumption of both water and chemicals.

SUMMARY

An object of the present invention is to provide improvements over prior art. This object is achieved by a technique defined in the appended independent claims; certain embodiments being set forth in the related dependent claims.

In a first aspect, there is provided an arrangement for spraying a fluid to a piece of material, such as a web or strip, comprising a chamber through which the material runs, and a number of valves arranged within the chamber and configured to spray fluid on material. Each valve has a spray nozzle, wherein each spray nozzle comprises an elongated opening extending along an axis. At least two of the number of valves is arranged spaced on a common axis running through a center point of each valve, wherein the axis of the opening is inclined in relation to the common axis. This arrangement is capable to create an inclined spray pattern which provides a better and more continuous result than what has previously been achieved.

Each valve may comprise a longitudinal axis, wherein the longitudinal axis and the axis of the corresponding nozzle span a plane which is inclined in relation to the common axis.

In an embodiment, the inclination of each axis of the opening and/or each plane is/are between 10° and 80° in relation to the common axis. Practical tests have shown that an inclination within this range improves the spray pattern.

In a preferred embodiment, the inclination of each axis of the opening and/or each plane is/are about 30° in relation to the common axis.

In another preferred embodiment each axis of the opening and/or each plane of the arrangement has/have the same degree of inclination.

Further, the valves are preferably arranged adjacent each other creating a main spray pattern on the material where the spray pattern created by each nozzle overlaps at least the adjacent spray pattern when the material runs through the chamber. This is an advantage since adjacent nozzles can cover an area of a nozzle that is not working and still get the desired spray result.

In an embodiment, the arrangement comprises a fluid applicator having a number of valves arranged adjacent each other on said common axis. Preferably, there are at least four aligned valves.

Yet further, there may be provided a number of valves arranged adjacent each other on a first side of a first chamber portion of the chamber, configured to spray fluid to a first side of the material, and a number of valves arranged adjacent each other on a second side of a second chamber portion of the chamber, configured to spray fluid on a second side of the material. By this design a desired spray pattern can be achieved on both sides of the material.

In a preferred embodiment the valves are configured to operate simultaneously. This gives an even better and more even spray result studies have shown.

In a second aspect, there is provided an arrangement for spraying a fluid to a piece of material, such as a web or strip, having a chamber through which the material runs, and an applicator configured to spray fluid on the material. The applicator includes at least a first and a second valve arranged within the chamber, wherein each valve has a longitudinal axis, and each valve includes a spray nozzle. Each spray nozzle has an elongated opening extending along an axis, where the longitudinal axis of the valve and the axis of the corresponding nozzle span a plane. At least the first and second valve are arranged spaced on a common axis running through a center point of each first and second valve, where the plane is inclined in relation to the common axis. All features above may likewise be applicable to this second aspect.

In a third aspect, there is provided an arrangement for spraying a fluid onto a piece of material running through an elongated chamber between an elongated inlet and an elongated outlet between which a first or central plane is formed. The spray chamber comprises a number of spray nozzles which are disposed in at least one inner wall of the chamber and which are aligned in parallel to a central axis of the elongated chamber. Each spray nozzle has an elongated spray opening which is configured to spray fluid in a spraying direction towards the central plane. Each elongated spray opening defines a second plane in the spraying direction, namely a spray plane which is inclined with respect to the central plane of the chamber. This means that an inclination or tilting angle is formed between the first plane and the second plane in the intersection between the same, which is in the material feeding plane. This inclination angle is within the range of 10-80°, preferably about 30°. In a preferred embodiment, there are two sets of inclined spray nozzles arranged aligned in opposite inner walls of the chamber, which is on either side of the material running through the chamber. Hereby, the material is sprayed in an inclined spray pattern on both sides.

In a fourth aspect of the present invention there is provided a spray unit having an arrangement as described above.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION OF EMBODIMENTS

With reference to the drawings, an arrangement 10 for spraying a fluid to a piece of material M, such as a web or strip, is presented. The spray arrangement 10 is preferably a member of a spray unit of a fabric manufacturing process (not shown) where a web of fabric runs through each member of the process. The manufacturing process relates in this embodiment to a fabric material but may in other embodiments relate to other types of material, such as paper, wood, metal, plastic or other types. The material M, which is a web or a strip, runs in a substantially vertical direction V through the spray arrangement 10, but the direction in which the web runs may also be horizontal or any other preferred direction. The fluid to be sprayed can provide the material with different qualities, such as dirt-repellant, water-repellant, flame proof, or making the material softer or adding a desired adhesive.

The spray arrangement 10 includes an elongated chamber 11, through which the web M runs. The spray chamber 11 has an inlet 12 through which the material enters the chamber 11 and an outlet 13 through which the web M exits the chamber 11. Preferably, the spray chamber 11 consists of two identical, or at least similar chamber portions or halves 11a, 11b located opposite each other and divided by the inlet 12 and outlet 13 along a vertical axis VA. The inlet 12 and the outlet 13 extend horizontally, substantially along the width W1 of the chamber 10 creating a passage suitable for different widths W2 of the web M.

Further, the spray arrangement 10 includes a spray applicator 15 which is configured to contactless spray fluid on the surface of the web M, a feeding device (not shown) and a control unit (not shown). The control unit controls the feeding unit such that it provides the desired amount of fluid to the spray applicator 15. It can also control the spray pattern and how the spray applicator 15 operates.

The spray applicator 15 includes a number of valves 16, 16a, 16b, 16c each with a spray nozzle 17, 17a, 17b, 17c, where the valves 16, 16a, 16b, 16c can easily be controlled individually or in group. The valves 16, 16a, 16b, 16c with their spray nozzles 17, 17a, 17b, 17c are arranged along a common axis CA on a side wall 20a, 20b of each chamber portion 11a, 11b. The spray nozzles 17, 17a, 17b, 17c are further changeable in relation to the common axis CA in order to create a changeable spray pattern on the web M.

Figure 1:
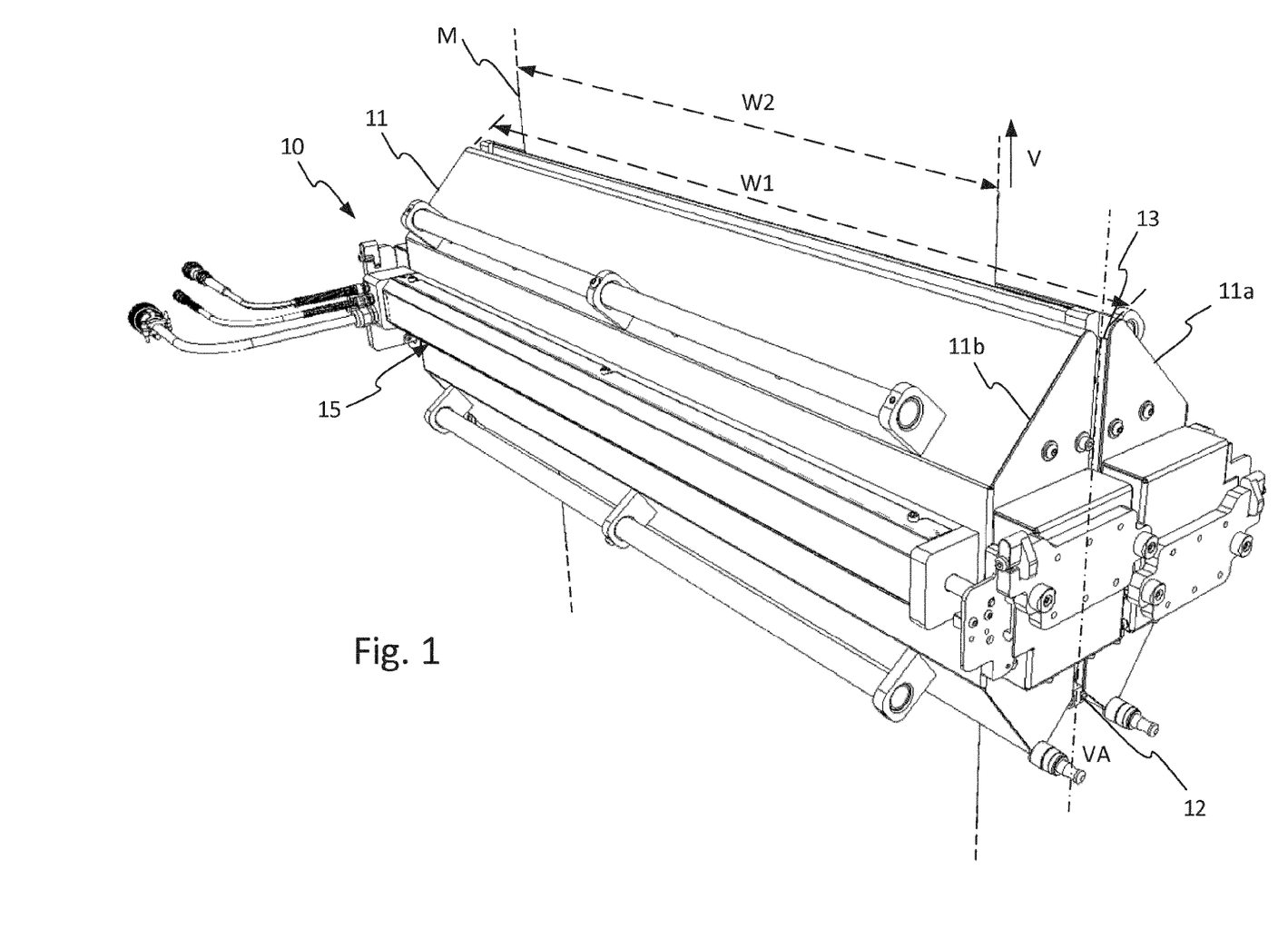
FIG. 1 is a perspective view of a spray unit according to an embodiment of the present invention.
Figure 2:
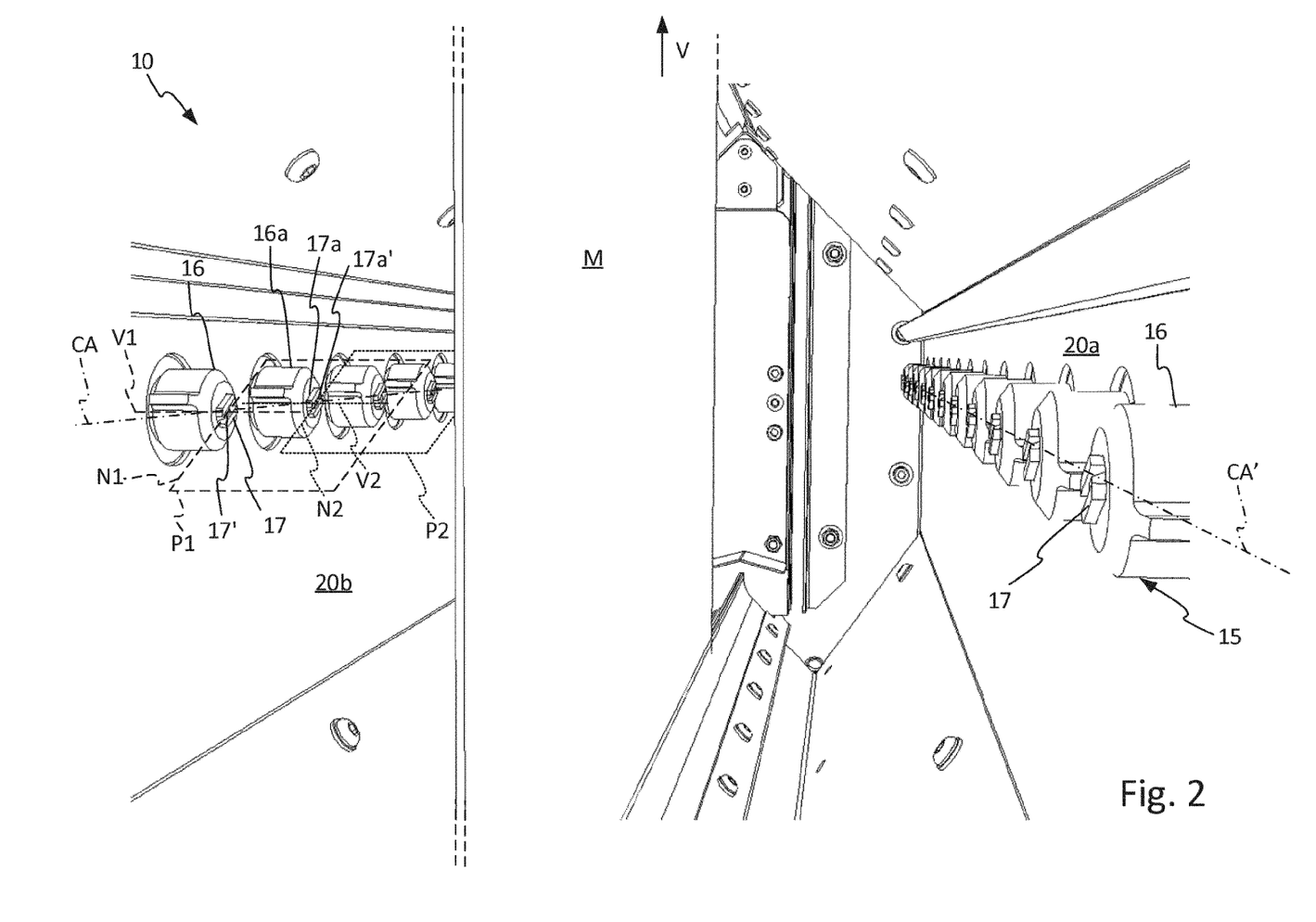
FIG. 2 is a perspective view of the inside of the spray unit in FIG. 1.
Figure 3:
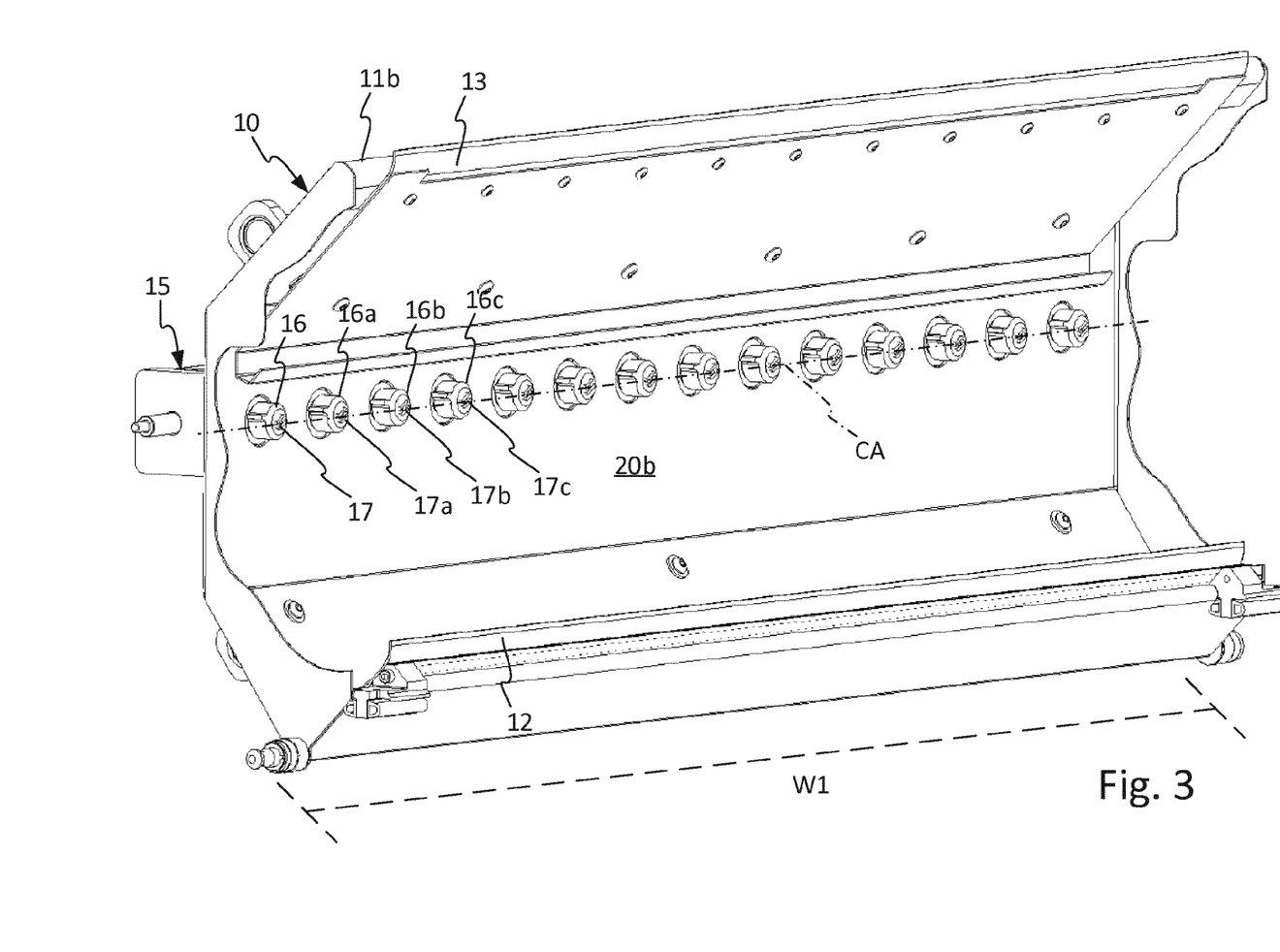
FIG. 3 is a perspective view of the inside of a spray chamber according to an embodiment of the present invention.
Figure 4:
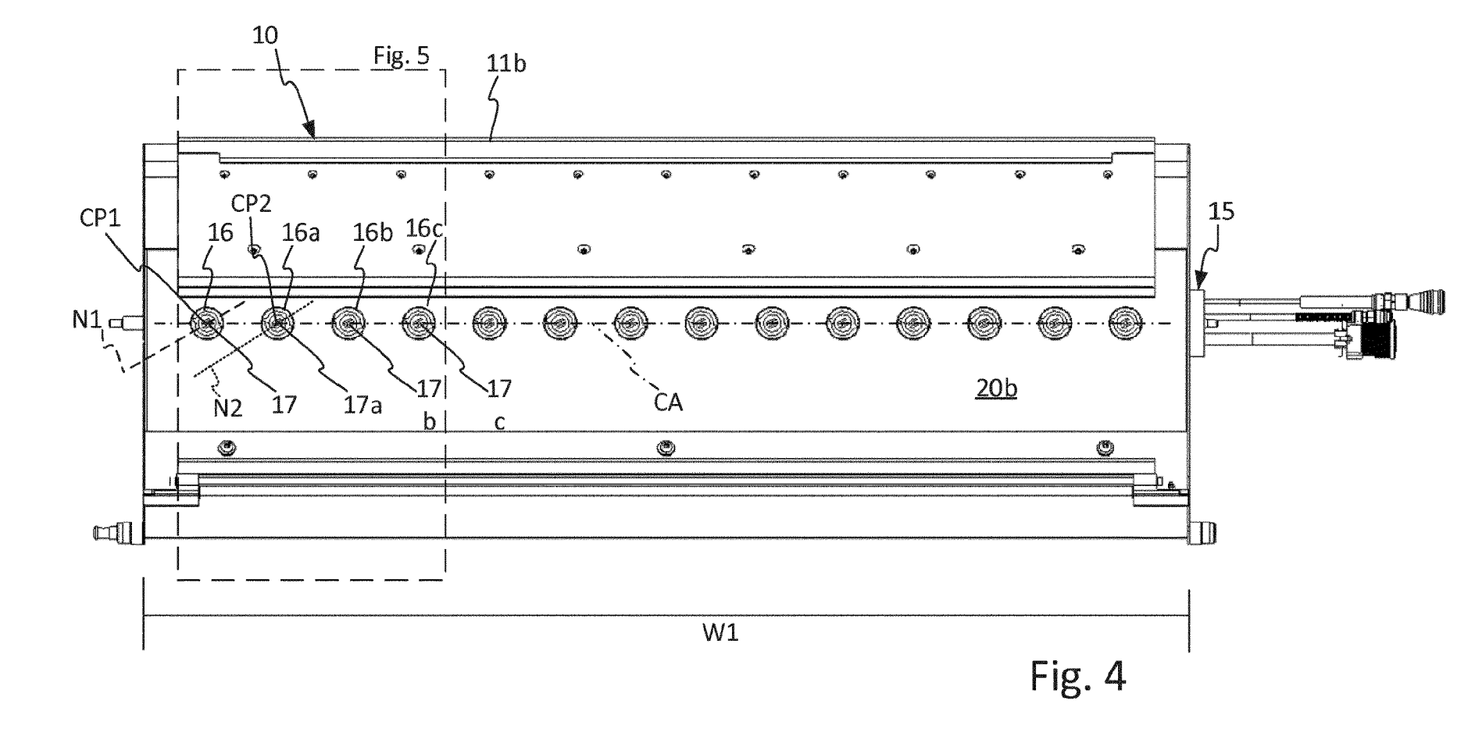
FIG. 4 is a front view of the inside of the spray chamber in FIG. 3.
Figure 5:
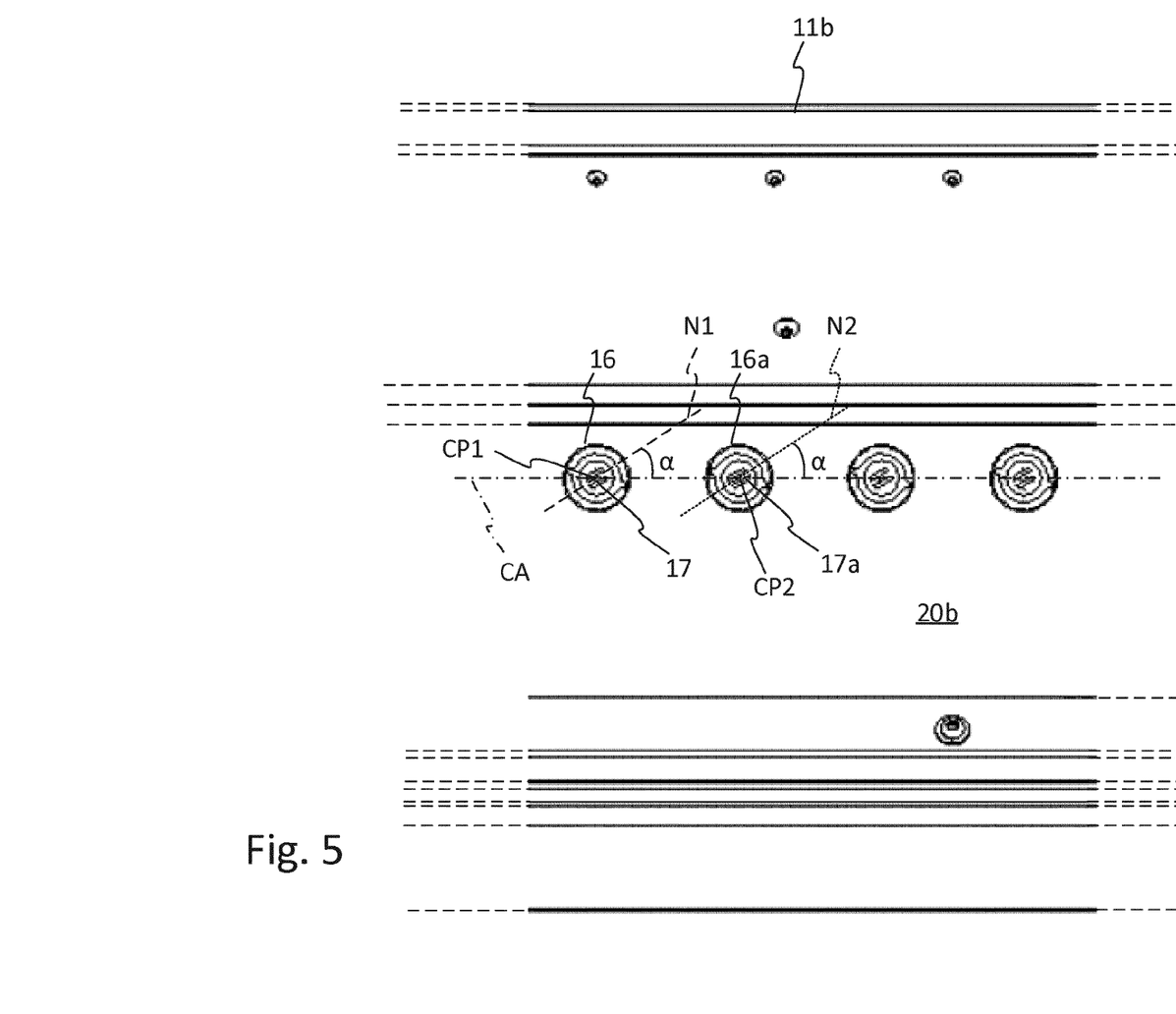
FIG. 5 is a detail view of a number of spray nozzles in FIG. 4.

As shown in FIG. 2 a first valve 16 has a longitudinal axis V1 in the longitudinal direction of the valve 16. The spray nozzle 17 of that valve 16 has in turn an axis N1 in the direction of the extension of the elongated opening 17' of the nozzle 17. The longitudinal axis V1 of the valve 16 and the axis N1 of the nozzle 17 span a first plane P1. In the same way, an adjacent second valve 16a has a longitudinal axis V2 in the longitudinal direction of the valve 16a and its spray nozzle 17a has an axis N2 in the direction of the extension of the elongated opening 17a' of the nozzle 17a. The second longitudinal axis V2 and the second nozzle axis N2 span a second plane P2. The longitudinal axis V1 of the first valve 16 and the longitudinal axis V2 of the second valve 16a are parallel. Each subsequent valve 16b, 16c and nozzle 17b, 17c span in the same way a plane of their own. All longitudinal axes of the valves 16, 16a, 16b, 16c are parallel.

Figure 6:
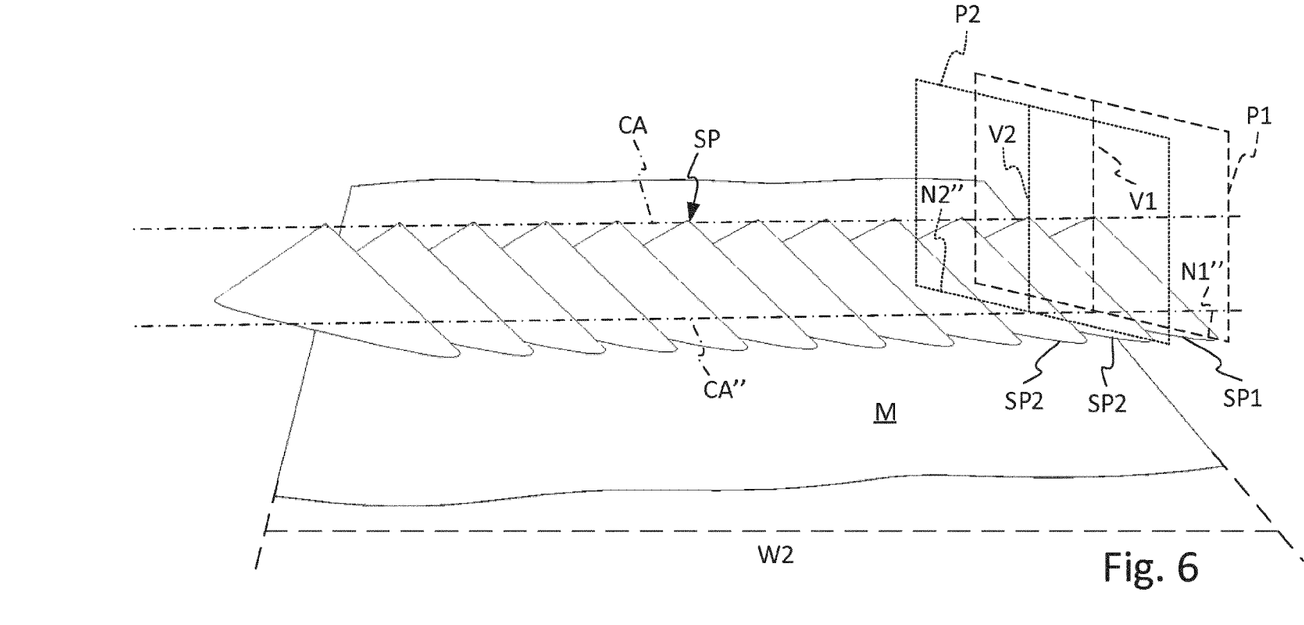
FIG. 6 is a perspective view of a main spray pattern with twelve spray nozzles according to an embodiment of the present invention.
Figure 8:
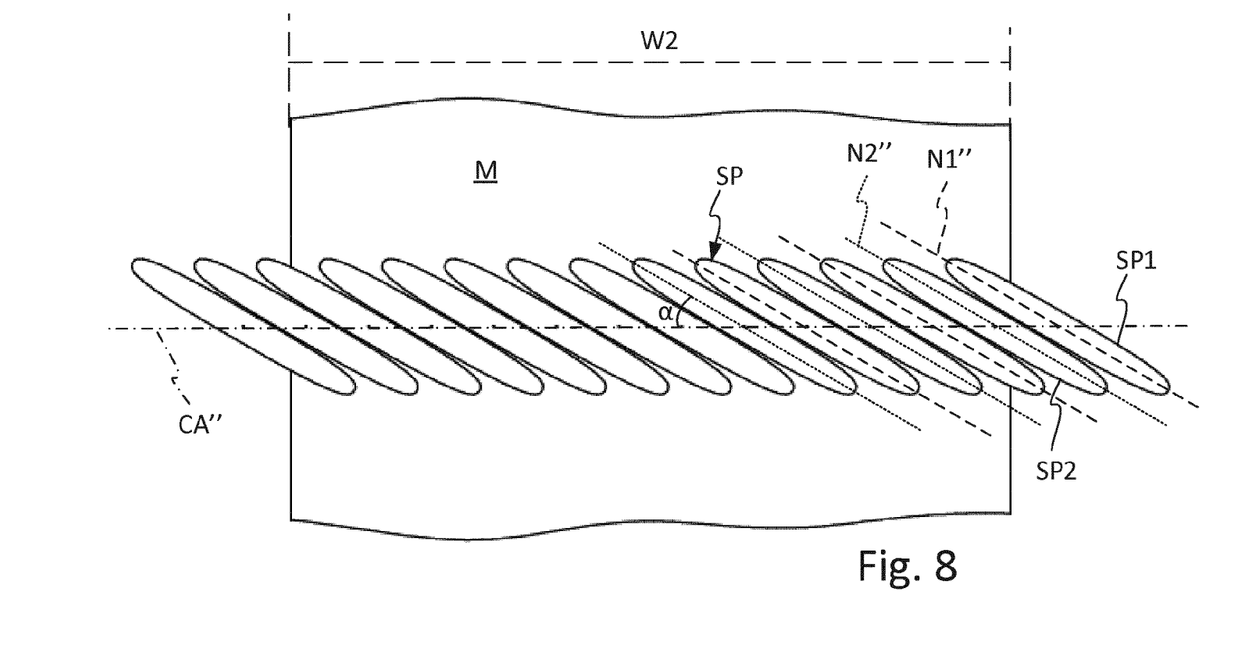
FIG. 8 is a top view of a main spray pattern with fourteen spray nozzles.
Figure 9:
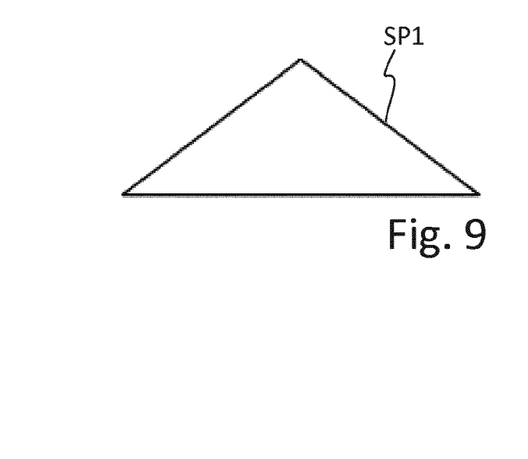
FIG. 9 is a front view of a spray pattern made by a spray nozzle according to an embodiment of the invention.
Figure 10:
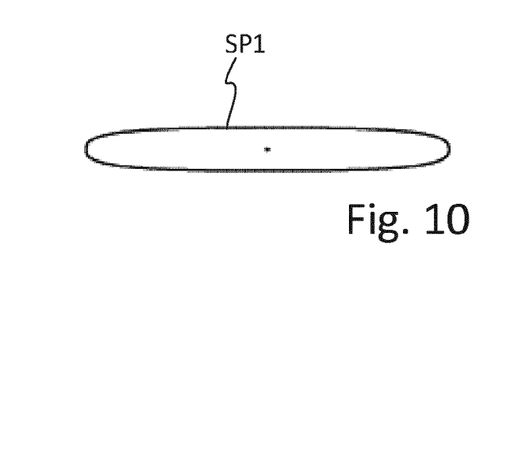
FIG. 10 is a top view of the spray pattern in FIG. 9.

The first and the adjacent second valve 16, 16a are located on a common axis CA, CA' (one on each chamber portion 11a, 11b) which runs through a center point CP1, CP2 of each valve 16, 16a. The first and second planes P1, P2 are both inclined a in relation to the common axis CA, CA'. The inclination α of each plane P1, P2 is between 10° and 80° in relation to the common axis CA, CA', and in a preferred embodiment between 20° and 30°. The inclination α may be varied by changing the direction of the extension of the longitudinal opening 17', 17a' of the nozzles 17, 17a. When changing the direction of the extension of the opening 17', 17a' the spray pattern SP1, SP2 created by the nozzle 17, 17a changes. The inclination α of each plane P1, P2 corresponds to the inclination of each spray pattern SP1, SP2. FIGS. 6 and 8 show the projection N1", N2" of the first and second nozzle axes N1, N2 and the projection CA" of the common axis CA on the web of material M running through the chamber. Also shown in FIGS. 6 and 8 are the first plane P1 and the projected nozzle axis N1" running through the center of the extension of the first spray pattern SP1 and the second plane P2 and the corresponding projected nozzle axis N2" running through the center of the extension of the second spray pattern SP2. The inclination α is shown between the spray patterns/planes SP1, SP2/P1, P2 and the projected common axis CA" on the material M.

Figure 7:
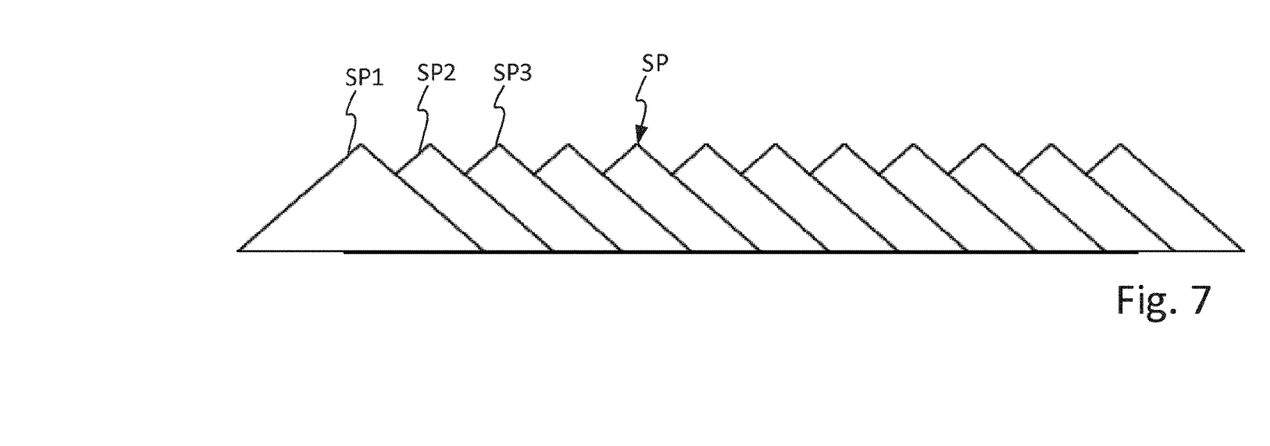
FIG. 7 is a front view of the spray pattern in FIG. 6.

The inclinations α of the two planes P1, P2 are preferably the same, and the two longitudinal axes V1, V2 are parallel which results in that the two planes P1, P2 are parallel without intersecting each other. When all valves 16, 16a, 16b, 16c on one side of the chamber 11 are arranged on the common axis CA, all longitudinal axes V1, V2 are parallel and the planes P1, P2 all have the same inclination and no plane P1, P2 will intersect another plane P1, P2 resulting in creating the main spray pattern SP shown in FIGS. 6-8. In order to vary the main spray pattern SP, it is preferred to change the direction of the extension of the opening of the spray nozzles in order to change the inclination α of the spray pattern. In the described embodiment the common axes CA, CA', CA" are horizontal axes. The inclination can also be explained as where the planes P1, P2 is inclined with respect to a plane formed by the width W2 of the web M running through the chamber 11.

In the described embodiment, the direction in which the web M runs is vertical but in alternative embodiments the setup of the direction can be another, such as horizontal or anything else in between vertical and horizontal. Depending on the setup of the arrangement the described axes, direction and planes may vary. When varying the direction of the extension of the openings 17', 17a' resulting in different degrees of inclination α of the spray pattern, a number of ten to twenty spray nozzles per meter is possible, instead of four to five nozzles per meter when the spray pattern has no inclination. This provides a regular spray pattern which provides a more even result and which is less sensitive to interruptions of one or more spray nozzles. Practical tests have also shown that the inclined spray pattern can lead to reduced water, chemical and energy consumption.

Each spray nozzle 17 of the spray arrangement 10 has, in the shown embodiment, the same degree of inclination which—after testing—has given the best result with the most regular spray pattern. The valves 16 are arranged adjacent each other creating the main spray pattern SP, wherein the spray pattern SP1 formed by the first spray nozzle 17 overlaps the spray pattern SP2, SP3 of at least the adjacent spray nozzle 17. In the described embodiment, see FIGS. 6-8, one spray pattern SP1 covers the area of the next two spray patterns SP2, SP3. This is an advantage if one or a couple of spray nozzles 17 are out of order. The result of the spray process will still be regular and acceptable.

In the described embodiment, there are no less than fourteen spray nozzles 17 arranged on the common axis CA adjacent each other on the side wall 20a of one chamber portion 11a. The two chamber portions 11a, 11b are preferably similar, so there are also fourteen spray nozzles 17 arranged on a common axis adjacent each other on a side wall 20b of the other chamber portion 11b, see FIG. 2. Both common axes are in the described embodiment horizontal axes. This enables the spray applicator 15 to spray both sides of the web M which runs vertically in between the two chamber portions 11a, 11b. The number of spray nozzles 17 may of course vary depending on for example the desired size of the chamber 11.

The spray arrangement and its spray nozzles may operate in any desired way. For example the spray nozzles may be controlled to operate with a continuously spray, a pulsating spray or a with a program-controlled spray pattern. By changing the direction of the extension of the opening of the spray nozzles and inclining its spray pattern the spray arrangement is able to adapt to different width of the substrate, simply by controlling how many nozzles that should be operating. Thus, it is easier to adapt the spraying process to the desired spray result by having changeable nozzles.

In an aspect there may be provided a chamber for fluid application to a piece of material such as a web or strip, arranged to run through the chamber. The chamber comprises a fluid applicator for fluid application to the material, an inlet through which the material is fed into the chamber and an outlet through which the material exits the chamber. It further includes an outlet passage device arranged at the outlet and configured to form an outlet fluid sealing of the chamber, and an inlet passage device arranged at the inlet and configured to form an inlet fluid sealing of the chamber (not shown). The fluid chamber defines a space which in an assembled state, for example during the process of applying fluid to the material, is sealed so that no fluid can exit the chamber. The sealing can preferably include elongated sealing lips arranged at the inlet and outlet, and gable sealings arranged at the two gables of the chamber. The sealing lips seal the space between the two chamber portions at the inlet and outlet and the gable sealings seal the space between the two chamber portions at the gables (not shown).

Finally, although the inventive concept has been described above with reference to specific embodiments, it is not intended to be limited to the specific form set forth herein. Rather, the invention is limited only by the accompanying claims and other embodiments than the specific above equally possible within the scope of these appended claims.

The invention claimed is:

1. An arrangement for spraying a fluid onto a web of material comprising:
   a chamber through which said web of material runs in a direction of advancement; and
   a number of valves arranged within said chamber, the valves being adapted and configured to spray fluid on said web of material when said web of material is running through the chamber, each valve comprising a spray nozzle,
   wherein each spray nozzle comprises an elongated opening extending along an axis;
   wherein at least two of said number of valves are arranged spaced on a common axis running through a center point of each valve;
   wherein said valves are arranged adjacent each other and said axis of said elongated opening is inclined in relation to said common axis in a manner such that when the web of material runs through the chamber in the advancement direction and the valves are actuated to spray the fluid on the web of material, the valves together create a main spray pattern on said web of material, and a spray pattern created by a nozzle of one valve overlaps with at least a portion of a spray pattern of an adjacent nozzle within the main spray pattern, and the spray pattern created by the nozzle of the one valve is spaced in the advancement direction from the spray pattern of the adjacent nozzle; and
   wherein each said valve comprises a longitudinal axis, wherein said longitudinal axis and said axis of the elongated opening of the corresponding nozzle span a plane, and wherein said plane is inclined in relation to said common axis.

2. The arrangement according to claim 1, wherein the inclination of each plane is between 10° and 80° in relation to said common axis.

3. The arrangement according to claim 1, wherein the inclination of each plane is about 30° in relation to said common axis.

4. The arrangement according to claim 1, wherein each plane of said arrangement has the same degree of inclination.

5. The arrangement according to claim 1, further comprising a fluid applicator having a number of valves arranged adjacent each other on said common axis.

6. The arrangement according to claim 1, wherein a first portion of said number of valves are arranged adjacent each other on a first side of a first chamber portion of said chamber and configured to spray said fluid to a first side of said web of material, and a second portion of said number of valves are arranged adjacent each other on a second side of a second chamber portion of said chamber and configured to spray said fluid on a second side of said web of material.

7. The arrangement according to claim 6, comprising at least four valves on each side of said chamber.

8. The arrangement according to claim 1, wherein said common axis is a horizontal axis.

9. An arrangement for spraying a fluid onto a web of material, comprising
- a chamber having an inlet and an outlet, the chamber being adapted and configured to pass the web of material from the inlet to the outlet in a direction of advancement through the chamber; and
- an applicator configured to spray fluid on said web of material when the web of material passes through the chamber in the advancement direction;
- wherein said applicator comprises at least a first and a second valve arranged within said chamber, each valve having a longitudinal axis, and each valve comprising a respective spray nozzle;
- wherein each spray nozzle comprises an elongated opening extending along an axis;
- wherein said longitudinal axis of said valve and said axis of the elongated opening of the corresponding nozzle span a plane;
- wherein at least said first valve and said second valve are arranged adjacent and spaced on a common axis running through a center point of each first and second valves; and
- wherein said plane is inclined in relation to said common axis such that when the web of material runs through the chamber in the advancement direction and the first and second valves are actuated to spray the fluid on the web of material, a spray pattern created by the first spray nozzle overlaps with at least a portion of a spray pattern of the second spray nozzle, and the spray pattern created by the first spray nozzle is spaced in the advancement direction from the spray pattern created by the second spray nozzle, and the spray pattern created by the first spray nozzle is spaced from the spray pattern created by the second spray nozzle in a direction transverse to the web advancement direction.

10. A spray unit comprising an arrangement as claimed in claim 1.

11. An arrangement for spraying fluid onto a web of material which is adapted and configured to run through an elongated chamber from an elongated inlet to an elongated outlet in a direction of advancement and between which a central plane is formed; wherein said spray chamber comprises a number of valves each having a respective spray nozzle, the spray nozzles being disposed in at least one inner wall of the chamber and being aligned in parallel to a central axis of the elongated chamber; wherein each spray nozzle has an elongated spray opening which is configured to spray fluid in a spraying direction towards the central plane; wherein each elongated spray opening defines a spray plane in the spraying direction, said spray plane being inclined with respect to the central plane of the chamber at an inclination angle formed at an intersection between the central plane and the spray plane and wherein the spray plane of one nozzle overlaps with at least a portion of a spray plane of an adjacent nozzle, and the spray plane of the one nozzle is spaced from the spray plane of the adjacent nozzle in the advancement direction.

12. The arrangement according to claim 11, wherein said inclination angle is within the range of 10°-80°.

13. The arrangement according to claim 11, wherein said chamber comprises two sets of inclined spray nozzles arranged aligned in opposite inner walls of the chamber on either side of the material running through the chamber.

14. The arrangement according to claim 9, wherein the plane is inclined in relation to the common axis at an angle of between 10° and 30°.

15. The arrangement according to claim 11, wherein the inclination angle is between 10° and 30°.

16. The arrangement according to claim 1, wherein the main spray pattern created by the valves together extend continuously across said web of material.

17. The arrangement according to claim 1, wherein the number of valves arranged within said chamber are equally spaced on the common axis at 10 to 20 nozzles per meter.

18. The arrangement according to claim 11, wherein the spray planes created by the valves together extend continuously across said web of material.

19. The arrangement according to claim 11, wherein the number of valves arranged within said chamber are equally spaced on the common axis at 10 to 20 nozzles per meter.

20. The arrangement according to claim 9, wherein the main spray patterns created by the valves together extend continuously across said web of material.

21. The arrangement according to claim 9, wherein the number of valves arranged within said chamber are equally spaced on the common axis at 10 to 20 nozzles per meter.

* * * * *